(12) United States Patent
Williams

(10) Patent No.: US 6,573,891 B1
(45) Date of Patent: Jun. 3, 2003

(54) METHOD FOR ACCELERATING THE GENERATION AND DISPLAY OF VOLUME-RENDERED CUT-AWAY-VIEWS OF THREE-DIMENSIONAL IMAGES

(75) Inventor: James P. Williams, Princeton, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 207 days.

(21) Appl. No.: 09/694,189

(22) Filed: Oct. 23, 2000

(51) Int. Cl.[7] ............................................. G06T 17/00
(52) U.S. Cl. ...................................................... 345/419
(58) Field of Search ................................ 345/418, 419, 345/420, 423, 424, 426, 427

(56) References Cited

U.S. PATENT DOCUMENTS 5,594,842 A   1/1997  Kaufman et al. ............ 395/124

FOREIGN PATENT DOCUMENTS

| EP | 0791894 | 8/1997 |
| EP | 1001379 | 5/2000 |
| WO | WO9720288 | 6/1997 |
| WO | WO9900052 | 1/1999 |

*Primary Examiner*—Cliff N. Vo
(74) *Attorney, Agent, or Firm*—Donald B. Paschburg; F. Chau & Associates, LLP

(57) ABSTRACT

There is provided a method for accelerating the generation and display of volume-rendered cut-away-views of three-dimensional images. The method includes the step of rendering a three-dimensional image from a set of textured image surfaces. At least one image corresponding to at least one intermediate result of the rendering step is accumulated. The at least one image includes at least one accumulation of at least two of the textured image surfaces. The at least one image is stored in a volume buffer for subsequent rendering of cut-away-views of the three-dimensional image therefrom. The accumulating step includes the step of accumulating one image for each of the plurality of textured image surfaces. Alternatively, the accumulating step includes the step of accumulating one image for only some of the plurality of textured image surfaces.

21 Claims, 5 Drawing Sheets

METHOD FOR ACCELERATING THE GENERATION AND DISPLAY OF VOLUME-RENDERED CUT-AWAY-VIEWS OF THREE-DIMENSIONAL IMAGES

BACKGROUND

1. Technical Field

The present invention relates generally to image processing and, in particular, to a method for accelerating the generation and display of volume-rendered cut-away-views of three-dimensional images.

2. Background Description

One approach to rendering volumetric images such as those created by medical imaging modalities like Computed Tomography (CT) or Magnetic Resonance (MR) is composited volume rendering. In this type of rendering, multiple parallel image textured planes are re-sampled (accumulated) from the original volume and then composited (drawn) into the frame buffer starting with the planar texture most distant from the viewer and progressing in depth-sorted order (back-to-front). A blending function defines how a texture is composited to the existing result in the frame buffer. This blending function can take many forms. One example is the MAX( ) functions which result in a type of rendering called a Maximum Intensity Projection.

Every time the viewing position is changed, the positions and/or orientations of these planar textures may change with respect to the change in viewing position and the compositing procedure must be repeated entirely to update the frame buffer. Compositing is usually the most time consuming component of a volume-rendering procedure.

It is often desirable to produce cut-away views of the volume image. In such a view, a plane is intersected with the original volume image and only those voxels in one of the halfspaces defined by the plane are rendered. This plane is referred to as a cut-plane.

Such cut-away views are useful for understanding the internal structures of volume images. In current practice, however, specifying or moving a cut-plane will necessitate re-compositing the volume.

FIG. 1 is a diagram illustrating a diagonal cut-plane intersecting a volume comprised of a set 100 of nine texture planes 1–9, according to the prior art. The halfspace of this plane containing the viewer 104 (designated by an eye) is being cut away. Those portions of textures not to be rendered are denoted by cross-hatched lines. After cutting away the designated portions of the texture planes, the values of the points P1 through P4 are as follows, with the symbol "+" denoting the composition operator:

P1=1+2+3+4+5+6+7+8+9

P2=1+2+3+4+5+6+7+8

P3=1+2+3+4+5+6+7

P4=1+2+3+4+5+6

Re-compositing the texture planes to obtain the cut-away-view costs 30 (9+8+7+6) accesses to the textures and 26 composing operations (8+7+6+5).

Accordingly, it would be desirable and highly advantageous to have a method for generating and displaying volume-rendered cut-away-views of three-dimensional images that do not require re-compositing the volume when specifying or moving a cut-plane.

SUMMARY OF THE INVENTION

The present invention is directed to a method for generating and displaying volume-rendered cut-away-views of three-dimensional images.

According to a first aspect of the invention, there is provided a method for accelerating the generation and display of volume-rendered cut-away-views of three-dimensional images. The method includes the step of rendering a three-dimensional image from a set of textured image surfaces. At least one image corresponding to at least one intermediate result of the rendering step is accumulated. The at least one image includes at least one accumulation of at least two of the textured image surfaces. The at least one image is stored in a volume buffer for subsequent rendering of cut-away-views of the three-dimensional image therefrom.

According to a second aspect of the invention, the accumulating step includes the step of accumulating one image for each of the plurality of textured image surfaces.

According to a third aspect of the invention, the accumulating step includes the step of accumulating one image for only some of the plurality of textured image surfaces.

According to a fourth aspect of the invention, the method further includes the step of generating a cut-away-view of the three-dimensional image by intersecting the at least one image with a volume of the three-dimensional image.

According to a fifth aspect of the invention, the method further includes the step of displaying the cut-away-view of the three-dimensional image.

According to a sixth aspect of the invention, the method further includes the step of generating a cut-away-view of the three-dimensional image by re-compositing missing intermediate results from the at least one image.

According to a seventh aspect of the invention, the method further includes the step of displaying the cut-away view of the three-dimensional image.

According to an eighth aspect of the invention, the rendering step includes the step of compositing the set of textured image surfaces to a single frame buffer, and the method further includes the step of configuring the volume buffer to have a same width and a same height as the single frame buffer.

According to a ninth aspect of the invention, the method further includes the step of moving an existing halfspace partition to display a cut-away-view different than an existing cut-away-view of the three-dimensional image by intersecting the at least one image with a volume of the three-dimensional image.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

The present invention is directed to a method for accelerating the generation and display of volume-rendered cut-away-views of three-dimensional images. It is to be understood that the present invention may be implemented in various forms of hardware, software, firmware, special purpose processors, or a combination thereof. Preferably, the present invention is implemented in software as a program tangibly embodied on a program storage device. The program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed.

Figure 2:
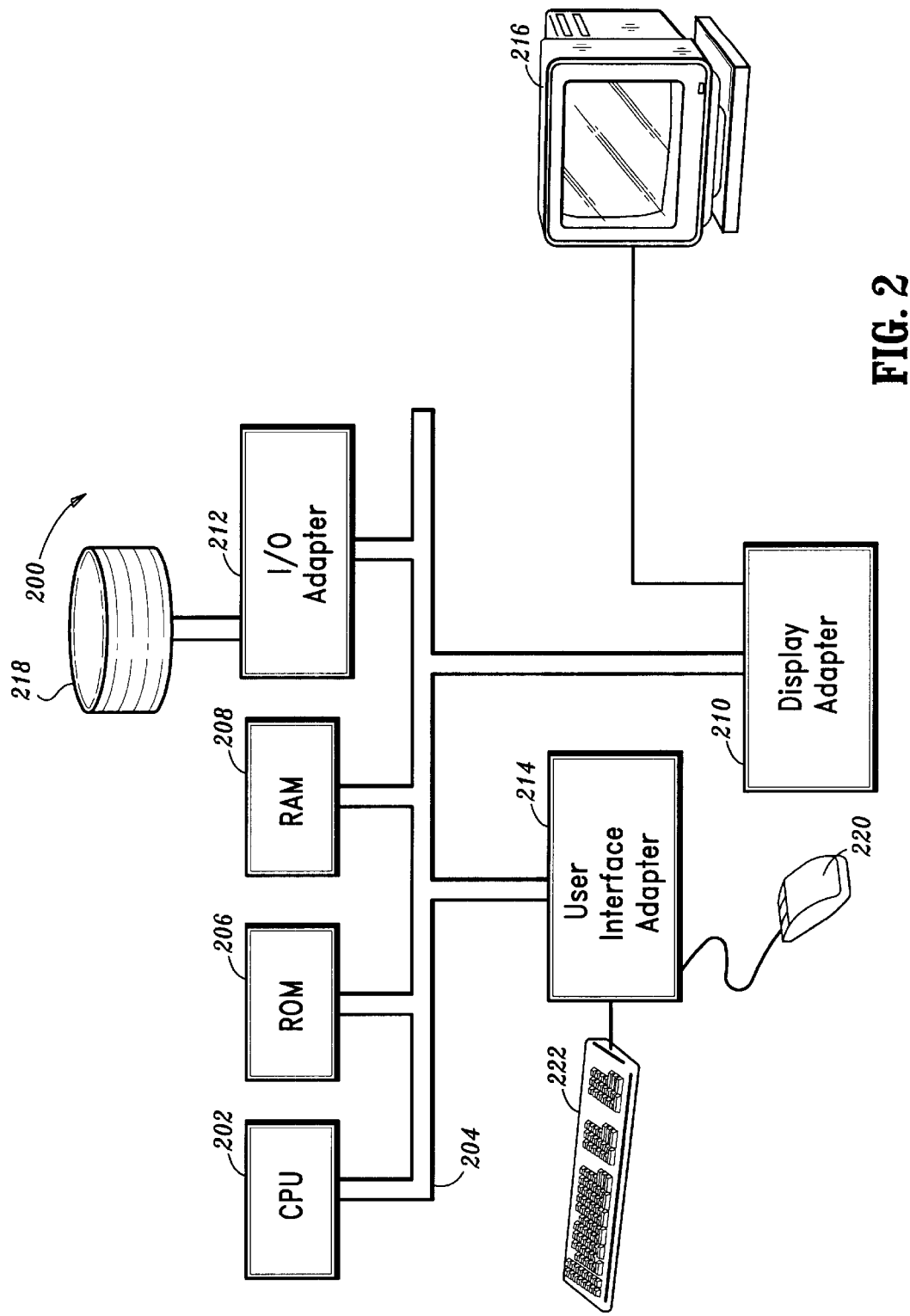
FIG. 2 is a block diagram of a computer processing system to which the present invention may be applied according to an embodiment of the present invention.

FIG. 2 is a block diagram of a computer processing system 200 to which the present invention may be applied according to an embodiment of the present invention. The system 200 includes at least one processor (hereinafter processor) 202 operatively coupled to other components via a system bus 204. A read only memory (ROM) 206, a random access memory (RAM) 208, a display adapter 210, an I/O adapter 212, and a user interface adapter 214 are operatively coupled to system bus 204.

A display device 216 is operatively coupled to system bus 204 by display adapter 210. A disk storage device (e.g., a magnetic or optical disk storage device) 218 is operatively coupled to system bus 204 by I/O adapter 212.

A mouse 220 and keyboard 224 are operatively coupled to system bus 204 by user interface adapter 214. The mouse 220 and keyboard 224 are used to input and output information to and from system 200.

A general description of the invention will now be provided to introduce the reader to the concepts of the invention. Subsequently, more detailed descriptions of various aspects of the invention will be provided.

In generating and displaying volume-rendered cut-away-views of three-dimensional images, the invention presumes that the position of the viewer remains constant with respect to the volume and that the user intends only to introduce or move a cut-plane.

In contrast to the prior art, which simply composites to the single frame buffer during a rendering step, the invention advantageously accumulates a set of images in an intermediate volume buffer VB[ ]. The height and width of the intermediate volume buffer VB[ ] are preferably the same as that of the frame buffer. However, the set of images stored in the intermediate volume buffer VB[ ] may number as many as one per planar. It is to be appreciated that the set of images stored in the intermediate volume buffer VB[ ] corresponds to intermediate results after the first rendering.

Figure 1:
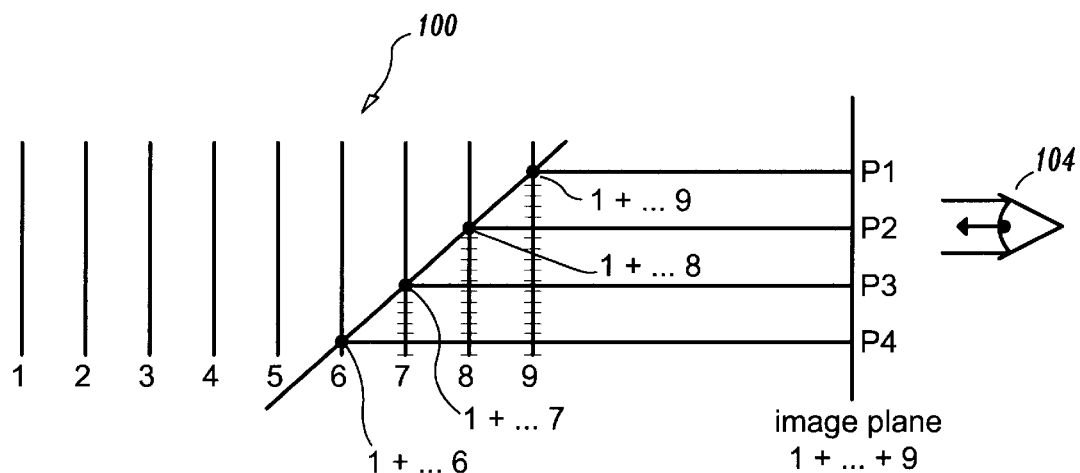
FIG. 1 is a diagram illustrating a diagonal cut-plane intersecting a volume comprised of a set 100 of nine texture planes 1–9, according to the prior art.
Figure 3:
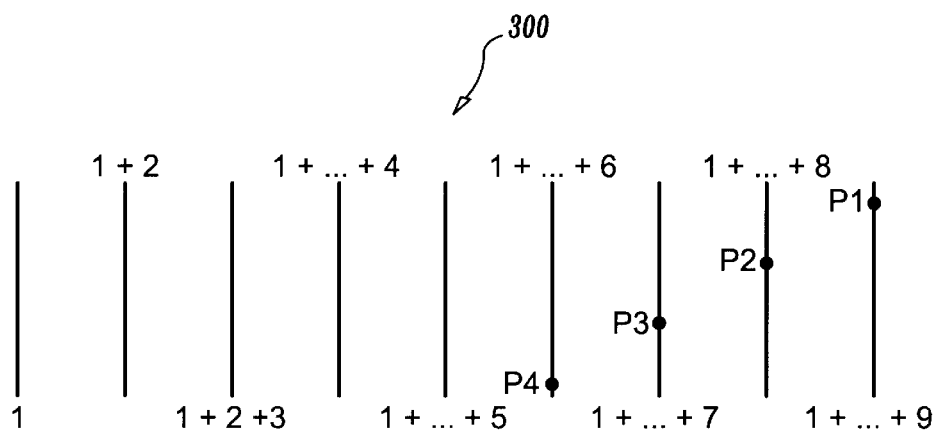
FIG. 3 is a diagram illustrating intermediate results produced after a first rendering of the set of parallel image textured planes of FIG. 1, according to an illustrative embodiment of the invention.

FIG. 3 is a diagram illustrating intermediate results 300 produced after a first rendering of the set of parallel image textured planes 102 of FIG. 1, according to an illustrative embodiment of the invention. In FIG. 3, the values for points P1 through P4 can be directly obtained from the intermediate volume buffer VB[ ]. Generation of the values of P1 through P4 directly from the intermediate volume buffer VB[ ] costs only 4 texture accesses and no compositing operations, in contrast to the prior art which would require 30 accesses to the textures and 26 composing operations as noted above.

Figure 4:
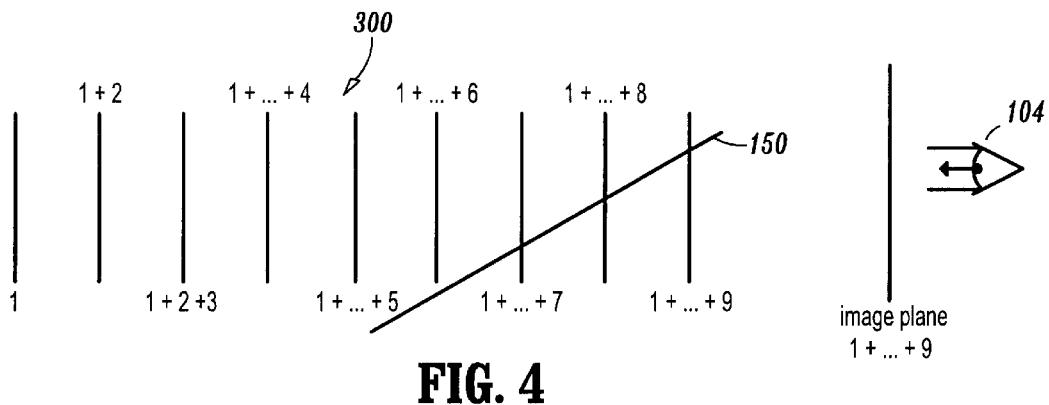
FIG. 4 is a diagram illustrating a cut-plane with respect to the stored intermediate results of FIG. 3, according to an illustrative embodiment of the invention.

Thus, the invention advantageously allows for resampling of a single planar texture from the intermediate volume buffer VB[ ], which is significantly less computationally intensive than re-compositing the entire volume, as is readily apparent to one of ordinary skill in the related art. That is, if the intermediate results from the first rendering are stored, then a cut-away-view may be generated by simply intersecting a plane with the volume; re-summing of the intermediate sums (or any other corresponding function) is not required. FIG. 4 is a diagram illustrating a cut-plane 450 with respect to the stored intermediate results 300 of FIG. 3, according to an illustrative embodiment of the invention.

Figure 5:
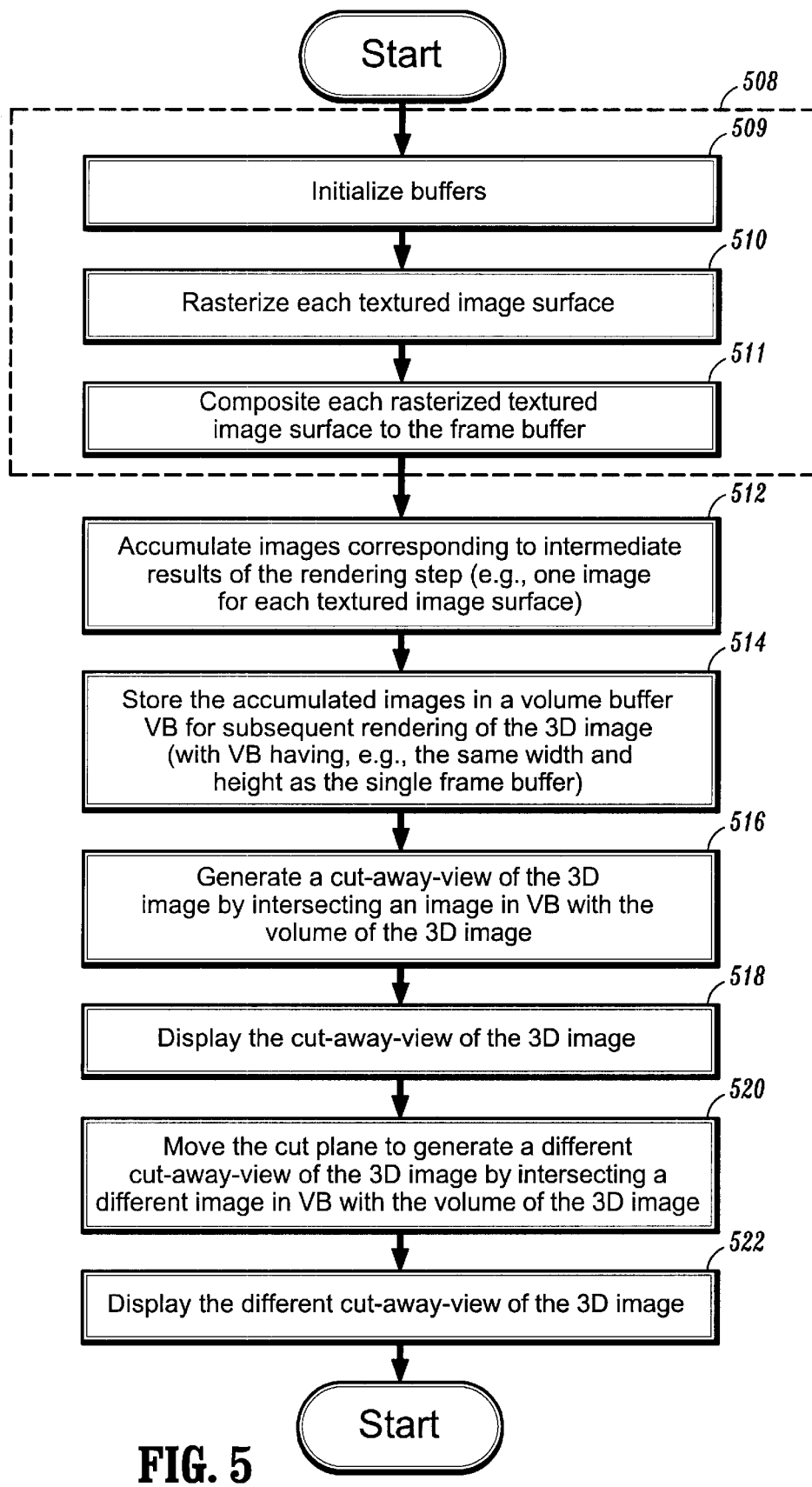
FIG. 5 is a flow diagram illustrating a method for accelerating the generation and display of volume-rendered cut-away-views of three-dimensional images, according to an illustrative embodiment of the invention.

FIG. 5 is a flow diagram illustrating a method for accelerating the generation and display of volume-rendered cut-away-views of three-dimensional images, according to an illustrative embodiment of the invention.

A three-dimensional image comprised of a set of textured image surfaces is rendered (step 508). The rendering step includes sub-steps 509 through 511.

Initially, at step 509, we set the buffers (i.e., a single frame buffer and an intermediate volume buffer VB[ ]) to their initial state (usually all zeroes). Then, each textured image surface (Ti) is rasterized, that is, each textured image surface Ti is converted into an image of the correct size and shape dependent on the projection parameters) (step 510). Each rasterized textured image surface is then composited to the frame buffer (step 511).

Images corresponding to intermediate results of the rendering step are accumulated (step 512). For example, one image may be accumulated for each textured image surface. The accumulated images are stored in an intermediate volume buffer VB[ ] for subsequent rendering of cut-away-views of the three-dimensional image therefrom (step 514).

A cut-away-view of the three-dimensional image is generated by intersecting an image in the intermediate volume buffer VB[ ] with the volume of the three-dimensional image (step 516). The cut-away-view of the three-dimensional image is then displayed (step 518).

The cut plane is moved to generate a different cut-away-view of the three-dimensional image by intersecting a different image in the intermediate volume buffer VB[ ] with the volume of the three-dimensional image (step 520). The different cut-away-view of the three-dimensional image is then display (step 522).

As is readily apparent to one of ordinary skill in the related art, steps 516–522 of the method of FIG. 5 are performed in significantly less time and with significantly less computational burden as compared to the prior art.

Figure 6:
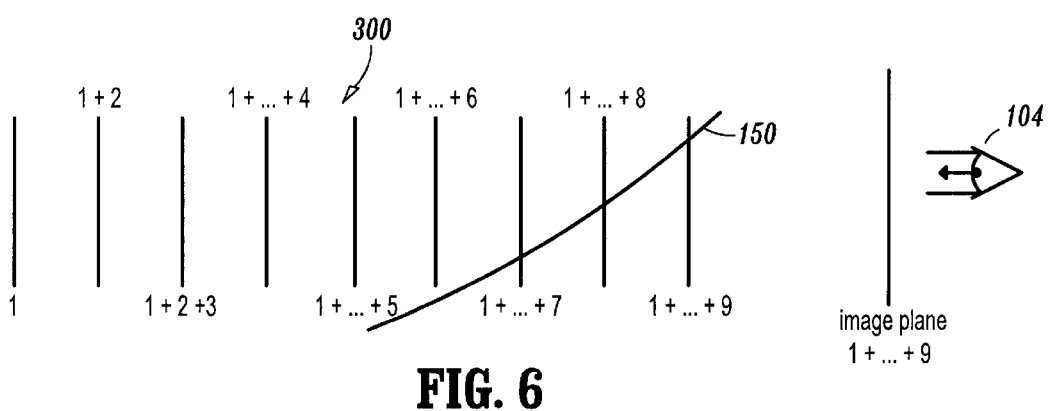
FIG. 6 is a diagram illustrating warping of the cut plane of FIG. 4 due to a transition from an orthographic view to a perspective view of the three-dimensional image.

In the case of other projection models, the mapping between the three-dimensional coordinate system of the original volume (hereinafter "Cvol") and the coordinate system of the intermediate volume buffer (hereinafter "Cvb") may no longer be linear. This means a plane defined in Cvol can map to a curved surface in Cvb. FIG. 6 is a diagram illustrating warping of the cut plane 150 of FIG. 4 due to a transition from an orthographic view to a perspective view of the three-dimensional image. It is to be appreciated that such warping does not present a problem with respect to the operation of the invention, as the cost of evaluating and resampling the curved surface is still likely to be much less computationally costly than re-compositing.

A description of an optimized embodiment of the invention will now be given. The method described above uses a memory intensive approach in which the intermediate volume buffer VB[ ] contains one image for every planar texture being mapped. However, it is to be appreciated that hybrid methods may be used such that only a subset of the intermediate results is stored and missing incremental results are re-composited on demand. This technique can be used to balance memory usage versus speed.

Figure 7:
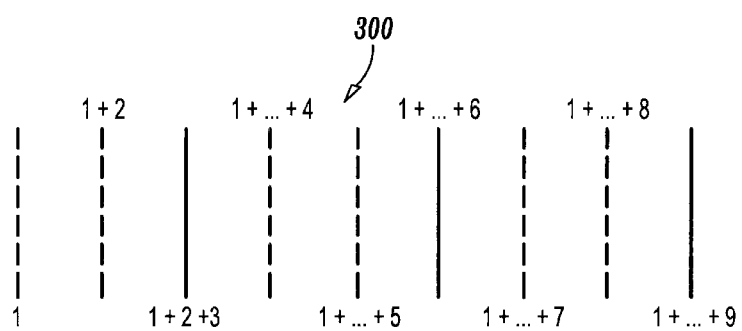
FIG. 7 is diagram illustrating a subset of the intermediate results of FIG. 3, according to an illustrative embodiment of the invention.

FIG. 3 can be considered to include N stored slices of intermediate results, where N=9. It is to be appreciated that storing all of the intermediate results 300 (i.e., all N slices) can consume a significant amount of memory. Thus, if only a subset of the intermediate results is stored, then only some of the intermediate results may require to be regenerated as opposed to regenerating all of the intermediate results as is done in the prior art. FIG. 7 is diagram illustrating a subset of the intermediate results (the N stored slices) of FIG. 3, according to an illustrative embodiment of the invention. In the illustrative embodiment, N/3 slices are stored in the intermediate volume buffer VB[ ]. The stored slices (the subset of the N slices) are represented by solid lines. The dashed lines represent the slices that are no longer stored and which may be required to be regenerated.

Figure 8:
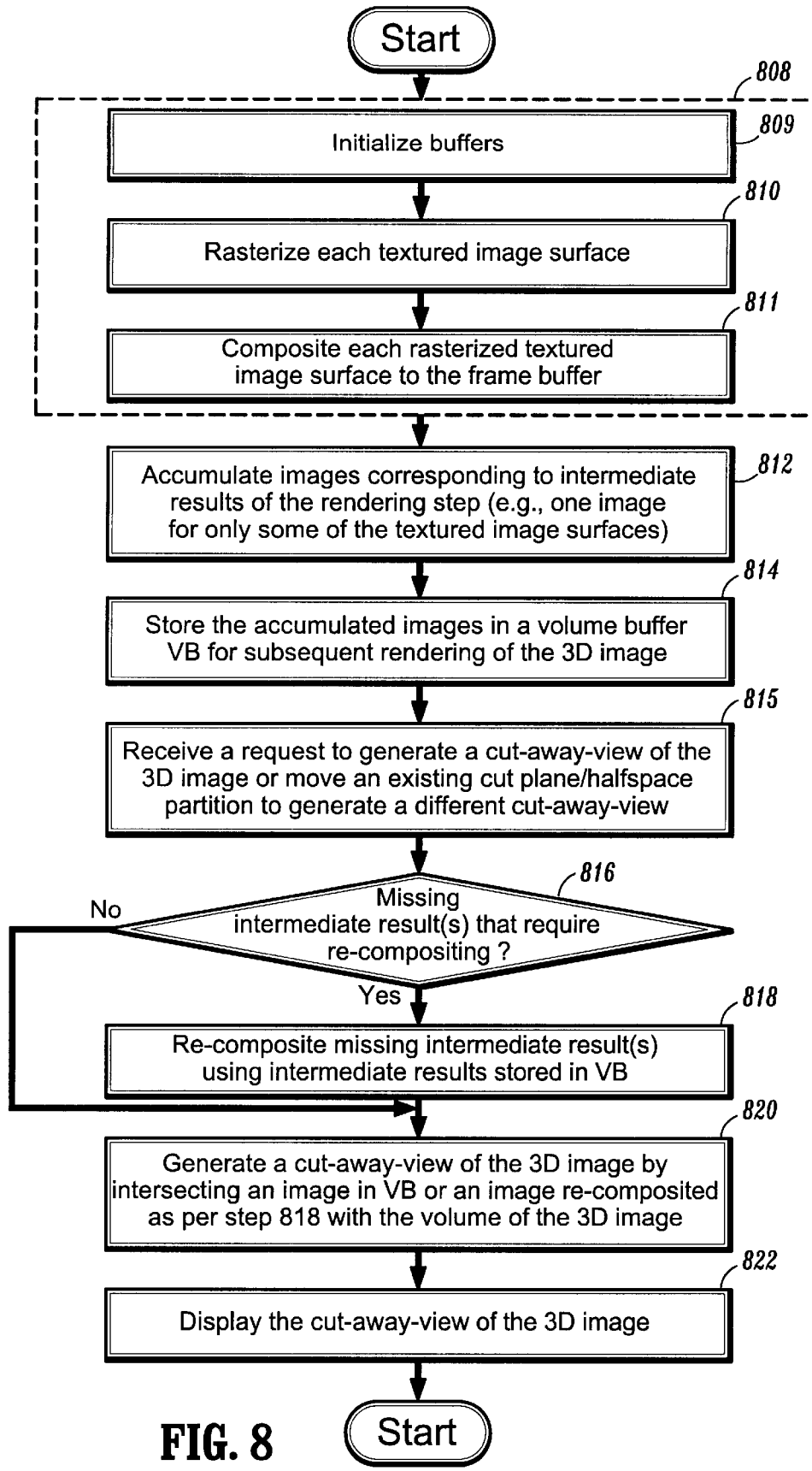
FIG. 8 is a flow diagram illustrating a method for accelerating the generation and display of volume-rendered cut-away-views of three-dimensional images, according to another illustrative embodiment of the invention.

FIG. 8 is a flow diagram illustrating a method for accelerating the generation and display of volume-rendered cut-away-views of three-dimensional images, according to another illustrative embodiment of the invention.

A three-dimensional image comprised of a set of textured image surfaces is rendered (step 808). The rendering step includes sub-steps 809 through 811.

Initially, at step 809, we set the buffers (i.e., a single frame buffer and an intermediate volume buffer VB[ ]) to their initial state (usually all zeroes). Then, each textured image surface (Ti) is rasterized, that is, each textured image surface Ti is converted into an image of the correct size and shape dependent on the projection parameters) (step 810). Each rasterized textured image surface is then composited to the frame buffer (step 811).

Images corresponding to intermediate results of the rendering step are accumulated (step 812). In this case, one image is accumulated for only some of the textured image surfaces. The accumulated images are stored in an intermediate volume buffer VB[ ] for subsequent rendering of cut-away-views of the three-dimensional image therefrom (step 814).

Upon receiving a request to generate a cut-away-view of the three-dimensional image or to move an existing cut plane (or other halfspace partition) to generate a different cut-away-view of the three-dimensional image, it is determined whether any missing intermediate results need to be re-composited (step 816). Such a situation would arise when a user intends to, for example, generate a cut-away-view corresponding to planes 1+ . . . +4, and the closest intermediate result stored in the intermediate volume buffer VB[ ] corresponds to planes 1+ . . . +3.

Thus, if it is determined at step 816 that there are missing intermediate results that need to be re-composited, then such missing intermediate results are re-composited using the intermediate results stored in the intermediate volume buffer VB[ ] (step 818), and the method proceeds to step 820. Otherwise, the method proceeds to step 820.

At step 820, the cut-away-view of the three-dimensional image is generated by intersecting an image in the volume buffer or an image re-composited as per step 818 (e.g., the image corresponding to 1+ . . . +4) with the volume of the three-dimensional image. The cut-away-view of the three-dimensional image is then displayed (step 822).

It is to be appreciated that while a single cut-plane is illustrated herein for the purpose of cutting away the foreground of a three-dimensional image, any halfspace partition may be used to accomplish the same. For example, convex and even non-convex surfaces may be used. Examples of convex surfaces include convex halfspace partitions such as a box, a hemisphere, and a convex triangular mesh. A preferred approach that may be used for all surfaces is, if the projection ray from the viewer intersects the cut-away surface at no more than 1 point, then this cut-away surface may be used to eliminate foreground. Given the teachings of the invention provided herein, one of ordinary skill in the related art will contemplate these and various other surfaces and approaches for cutting away foreground while maintaining the spirit and scope of the invention.

It is to be further appreciated that while the three-dimensional images illustrated herein have been comprised of a set of image textured planes, such images may also be comprised of non-planar textures. As is known, these non-planar textures are composited back-to-front in the same manner as planar textures are composited. By saving the intermediate results from such compositions in accordance with the present invention, the generation and display of cut-away-views corresponding thereto can similarly be accelerated. Given the teachings of the invention provided herein, one of ordinary skill in the related art will contemplate these and various other textures from which three-dimensional images can be composited while maintaining the spirit and scope of the invention.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for accelerating the generation and display of volume-rendered cut-away-views of three-dimensional images, said method comprising the steps of:

rendering a three-dimensional image from a set of textured image surfaces;

accumulating at least one image corresponding to at least one intermediate result of said rendering step, the at least one image comprising at least one accumulation of at least two of the textured image surfaces; and storing the at least one image in a volume buffer for subsequent rendering of cut-away-views of the three-dimensional image therefrom.

2. The method according to claim 1, wherein said accumulating step comprises the step of accumulating one image for each of the plurality of textured image surfaces.

3. The method according to claim 1, wherein said accumulating step comprises the step of accumulating one image for only some of the plurality of textured image surfaces.

4. The method according to claim 1, further comprising the step of generating a cut-away-view of the three-dimensional image by intersecting the at least one image with a volume of the three-dimensional image.

5. The method according to claim 4, further comprising the step of displaying the cut-away-view of the three-dimensional image.

6. The method according to claim 3, further comprising the step of generating a cut-away-view of the three-dimensional image by re-compositing missing intermediate results from the at least one image.

7. The method according to claim 6, further comprising the step of displaying the cut-away view of the three-dimensional image.

8. The method according to claim 1, wherein said rendering step comprises the step of compositing the set of textured image surfaces to a single frame buffer, and said method further comprises the step of configuring the volume buffer to have a same width and a same height as the single frame buffer.

9. The method according to claim 1, further comprising the step of moving an existing halfspace partition to display a cut-away-view different than an existing cut-away-view of the three-dimensional image by intersecting the at least one image with a volume of the three-dimensional image.

10. A method for accelerating the generation and display of volume-rendered cut-away-views of three-dimensional images, said method comprising the steps of:

rendering a three-dimensional image from a set of textured image surfaces;

accumulating a plurality of images corresponding to a plurality of intermediate results of said rendering step, the plurality of images comprising a plurality of accumulations of at least two of the textured image surfaces; and storing the plurality of images in a volume buffer for subsequent rendering of the three-dimensional image therefrom.

11. The method according to claim 10, further comprising the step of generating a cut-away-view of the three-dimensional image by intersecting one of the plurality of images with a volume of the three-dimensional image.

12. The method according to claim 11, further comprising the step of displaying the cut-away-view of the three-dimensional image.

13. The method according to claim 10, further comprising the step of generating a cut-away-view of the three-dimensional image by re-compositing missing intermediate results from one of the plurality of images.

14. The method according to claim 13, further comprising the step of displaying the cut-away view of the three-dimensional image.

15. The method according to claim 10, wherein said rendering step comprises the step of compositing the set of textured image surfaces to a single frame buffer, and said method further comprises the step of configuring the volume buffer to have a same width and a same height as the single frame buffer.

16. The method according to claim 10, further comprising the step moving an existing halfspace partition to display a cut-away-view different than an existing cut-away-view of the three-dimensional image by intersecting one of the plurality of images with a volume of the three-dimensional image.

17. A program storage device readable by machine, tangibly embodying a program of instructions executable by the machine to perform method steps for accelerating the generation and display of volume-rendered cut-away-views of three-dimensional images, said method steps comprising:

rendering a three-dimensional image from a set of textured image surfaces;

accumulating at least one image corresponding to at least one intermediate result of said rendering step, the at least one image comprising at least one accumulation of at least two of the textured image surfaces; and storing the set of images in a volume buffer for subsequent rendering of cut-away-views of the three-dimensional image therefrom.

18. The program storage device according to claim 17, wherein said accumulating step comprises the step of accumulating one image for each of the plurality of textured image surfaces.

19. The program storage device according to claim 17, wherein said accumulating step comprises the step of accumulating one image for only some of the plurality of textured image surfaces.

20. The program storage device according to claim 17, further comprising the step of generating a cut-away-view of the three-dimensional image by intersecting the at least one image with a volume of the three-dimensional image.

21. The program storage device according to claim 19, further comprising the step of generating a cut-away-view of the three-dimensional image by re-compositing missing intermediate results from the at least one image.

* * * * *